Oct. 23, 1923.
H. W. BELL ET AL
1,471,473
SPRING SHACKLE
Original Filed Feb. 12, 1921    2 Sheets-Sheet 1
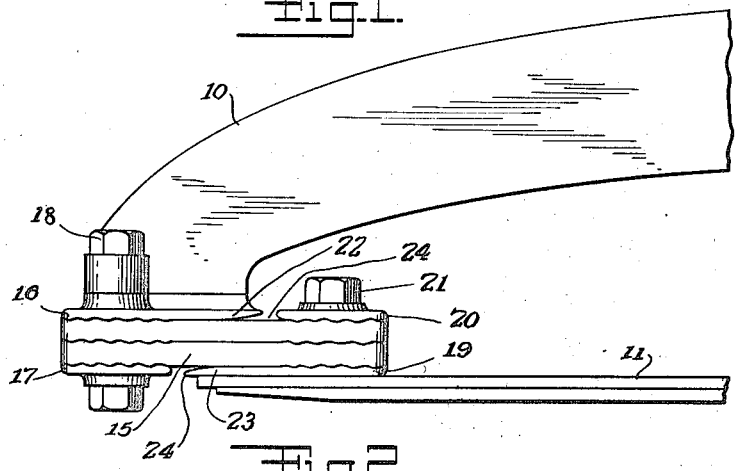
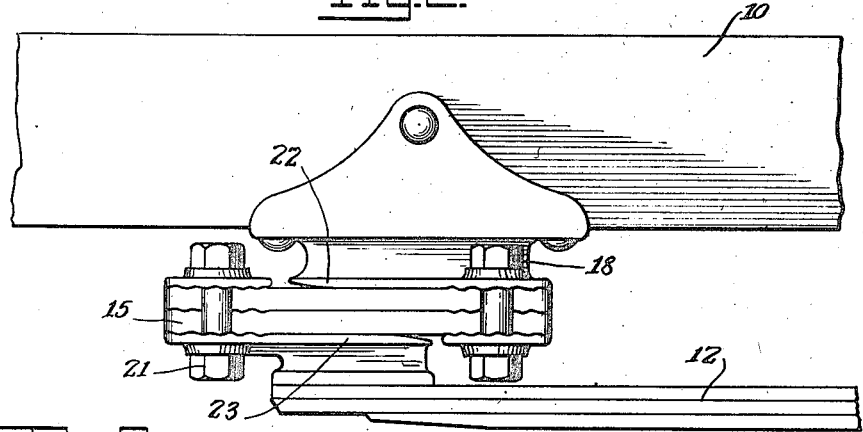
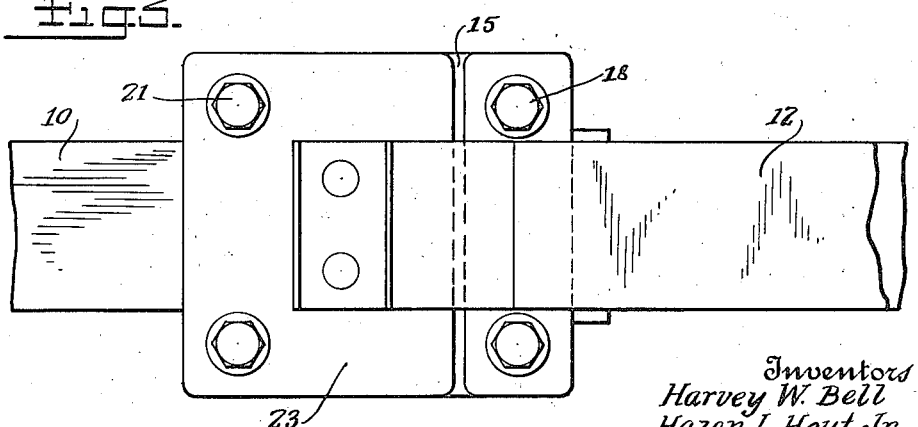
Inventors
Harvey W. Bell
Hazen L. Hoyt, Jr.
By their Attorney
E. W. Marshall

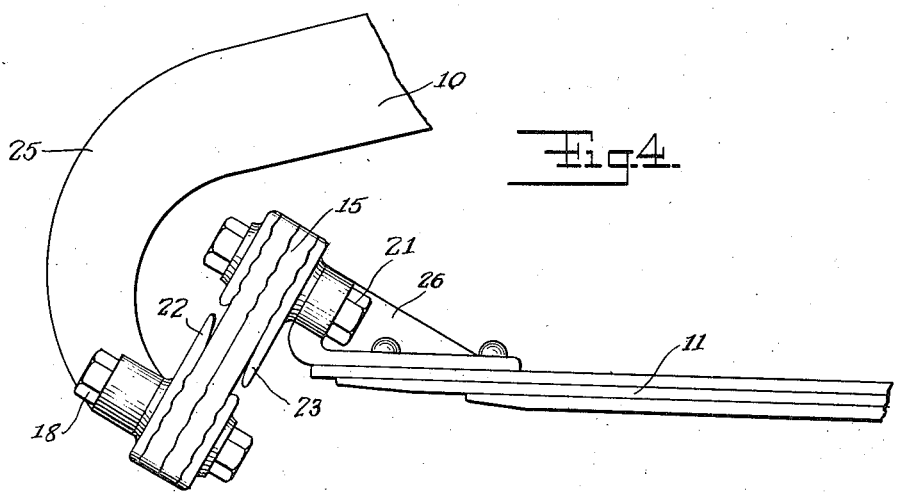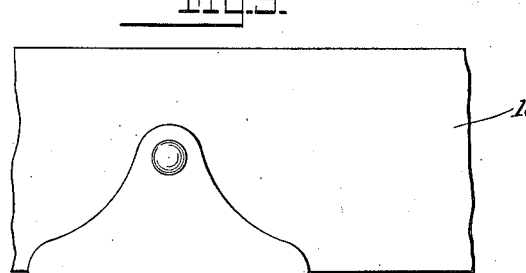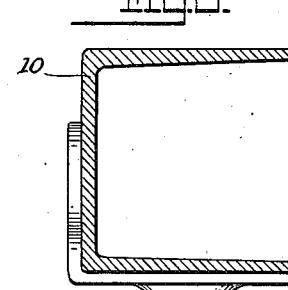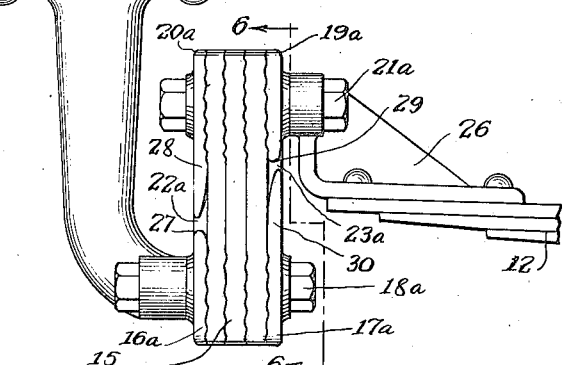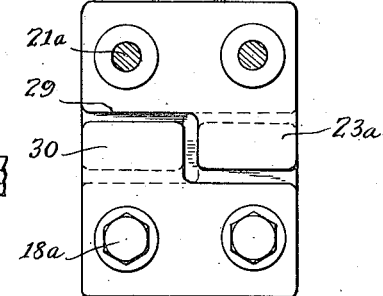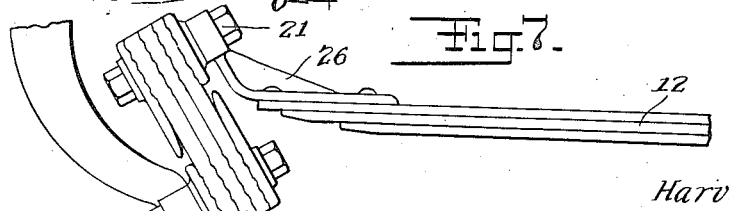

Patented Oct. 23, 1923.

1,471,473

UNITED STATES PATENT OFFICE.

HARVEY W. BELL, OF ARDSLEY-ON-HUDSON, AND HAZEN L. HOYT, JR., OF GREAT NECK, NEW YORK, ASSIGNORS TO THE BELOYT CORPORATION, OF DOVER, DELAWARE, A CORPORATION OF DELAWARE.

SPRING SHACKLE.

Application filed February 12, 1921, Serial No. 444,321. Renewed July 19, 1923.

*To all whom it may concern:*

Be it known that we, HARVEY W. BELL, a citizen of the United States, and a resident of Ardsley-on-Hudson, county of Westchester, and State of New York, and HAZEN L. HOYT, Jr., a resident of Great Neck, L. I., county of Nassau, and State of New York, have invented certain new and useful Improvements in Spring Shackles, of which the following is a specification.

This invention relates particularly to spring connections of the type wherein a certain amount of pivotal movement is provided between the connected parts, such for instance at the points where the front spring is connected to the front end of the vehicle frame and where the front end of the rear spring is connected with the frame.

The objects of the invention are to provide a connection of this character which will be simple in construction, noiseless in operation, easily applied and which will be fully capable of carrying the load to which such a connection is ordinarily subjected.

In our invention the parts which are to be connected are coupled together by a substantially flat link of material on the order of impregnated canvas belting which resists compressive forces and opposes flexure in the plane of the fabric and is freely flexible in directions at right angles to the plane of the fabric, a special feature of the invention being that the freely flexible intermediate portion of the link is interposed as a cushioning medium between opposed bearing surfaces carried by the coupled members.

In the drawings accompanying and forming part of this specification, we have illustrated the invention embodied in different forms, but wish it understood that the structure may be further modified without departure from the true spirit and scope of the invention as hereinafter defined and claimed.

In the drawings referred to, Figure 1 is a broken side elevation of one form of front end connection.

Figure 2 is a similar view of a rear spring connection.

Figure 3 is a bottom plan view of the latter.

Figure 4 is a view similar to Figure 1 of another form of front end connection.

Figure 5 is a view similar to Figure 2 of another form of rear spring connection.

Figure 6 is a sectional view on substantially the plane of line 6—6 of Figure 5.

Figure 7 is a broken detail of a further variation of the rear spring connection.

In the several views, 10 designates a side sill forming a part of the frame of a vehicle, 11 designates a front spring and 12 one of the rear springs.

In each instance the spring and frame are connected together by a link 15 of material such as "thermoid", rubber impregnated canvas belting or the like, which is strongly resistant to compressive forces and to flexing strains applied in the flat plane of the link and is on the other hand quite freely flexible in directions at right angles to the plane of the link. Also in each instance this flexible link is rigidly secured at its ends to the connected elements.

Thus in Figure 1 the front end of the frame member carries relatively fixed and movable clamp plates 16, 17 between which the forward end of the link is rigidly clamped by a screw bolt or bolts 18 and the spring carries at its forward end relatively fixed and movable clamp jaws 19, 20 between which the rearward end of the link is rigidly secured by a screw bolt or bolts 21.

To relieve the link of a large part of the carrying strains, the upper relatively fixed clamp jaw is extended rearwardly to provide a bearing 22 overstanding the intermediate or free portion of the link and the lower fixed jaw 19 is extended forwardly beyond the rear end of the upper bearing 22 to form a bearing 23 beneath the free portion of the link and in overlapping relation to the upper bearing. The ends of these bearings may be curved away from the link or relieved as shown at 24 to prevent chafing of the link and to facilitate the pivotal movements between the coupled parts.

With this construction it will be seen that the interposed link material operates as a cushion between the parts and that at the same time the link is free to flex as necessary to accommodate the different relative movements of the parts. This construction permits the link being made quite short and therefore all the more capable of resisting longitudinal compressive forces.

The link may be made up of as many plies or layers as necessary and if desirable strips of wearing material may be interposed between the surfaces of the link and the rolling or rocking bearing surfaces.

The connection for the rear spring, shown in Figure 2, is in general the same as that described for the front spring and similar reference characters have been applied thereto to enable its operation being understood from the foregoing. One difference may be noted and that is that the overlap of the upper and lower bearing members 22, 23 is somewhat greater than in the first instance, so as to more readily carry the load, which may be heavier at this point.

This latter construction is well adapted to the "Hotchkiss" type of drive where the driving force is applied through the rear springs, the longitudinal disposition of the links enabling them to operate as tension members for transmitting this force.

As the resultant of the applied driving forces is upwardly as well as forwardly, it is contemplated that the link may be positioned at an upward, forward incline corresponding to the angle of the applied forces, substantially as indicated in Figure 7, or the angle of the link might be reversed so that the forward thrust would be carried by the overlapping bearing shoulders with the section of the link therebetween operating as a cushioning medium.

In Figure 4 we have indicated how the forward link may be inclined to more nearly present its length to the approximate angle of the normally applied forces, the forward end of the frame in this instance being formed with a gooseneck 25 to support the clamp carried thereby in position to hold the link at a downward forward incline and the spring carried bracket 26 being suitably shaped to carry the other clamp at a similar incline.

Certain advantages are attained by arranging the links vertically as we have shown in Figure 5, this construction being particularly adapted for heavily loaded vehicles and where the spring is not called upon to transmit the driving force.

Where the thrust loads are particularly heavy, a further degree of control is obtained, by arranging the opposed bearing surfaces in staggered relation as illustrated particularly in Figures 5 and 6. In this construction the bearing member 22ª at one side of the link is shortened at one edge, as indicated at 27, and the jaw 20ª of the other clamp is extended to form a bearing element 28 and similarly, at the opposite face of the link, the bearing member 23ª is shortened at one edge at 29 to admit of the projection of a bearing member 30 from the clamp plate 17ª.

This construction, without materially interfering with the free flexing of the link, distributes the thrust strains and keeps the link under better control.

What we claim is:

1. A coupling for cooperating relatively movable supporting members of a vehicle comprising a link of flexible material, means for fixedly securing separated portions of the link to the supporting members and thrust bearings carried by said members and standing in overlapping relation at the opposite sides of the link.

2. A connection for the supporting parts of a vehicle comprising a flexible link, means for securing separated portions of the link to the connected parts and bearing shoulders carried by said connected parts and standing in overlapping relation at opposite sides of the link.

3. A connection for the supporting parts of a vehicle comprising a flexible link, means for securing separated portions of the link to the connected parts and bearing shoulders carried by said connected parts and standing in overlapping relation at opposite sides of the link, said bearing shoulders having curved bearing faces for rocking or rolling engagement with the opposite faces of the link.

4. A connection for the supporting parts of a vehicle comprising a flexible link, means for securing separated portions of the link to the connected parts and bearing shoulders carried by said connected parts and standing in overlapping relation at opposite sides of the link, said opposed bearing shoulders being positioned to carry a given load with the free portion of the link interposed therebetween as a cushioning medium.

5. In combination with related supporting members of a vehicle and a flexible connecting link, clamps carried by said members for rigidly securing separated portions of the link thereto and bearing extensions carried by said clamps and standing in overlapping relations at opposite sides of the link.

6. In combination with related supporting members of a vehicle, and a flexible connecting link, clamps carried by said members for rigidly securing separated portions of the link thereto and bearing extensions carried by said clamps and standing in overlapping relations at opposite sides of the link, each of said bearing members having relatively short and long bearing extensions and arranged with the unlike extensions of the two members longitudinally opposed.

In witness whereof, we have hereunto set our hands this 7th day of February, 1921.

HARVEY W. BELL.
HAZEN L. HOYT, Jr.